Oct. 27, 1925.

A. PURVIS

FLYCATCHER

Filed Nov. 19, 1924

1,559,373

Annett Purvis, Inventor

By Clarence A. O'Brien, Attorney

Patented Oct. 27, 1925.

1,559,373

UNITED STATES PATENT OFFICE.

ANNETT PURVIS, OF SHREVEPORT, LOUISIANA.

FLYCATCHER.

Application filed November 19, 1924. Serial No. 750,827.

*To all whom it may concern:*

Be it known that I, ANNETT PURVIS, a citizen of the United States, residing at Shreveport, in the parish of Caddo and State of Louisiana, have invented certain new and useful Improvements in a Flycatcher, of which the following is a specification.

This invention relates to fly traps or catchers and it consists in the novel features hereinafter described and claimed.

An object of the invention is to provide a device of the character stated which is of simple and durable form having its parts and features compactly assembled and arranged to cooperate to lure the flies and entrap them.

In the accompanying drawing:—

Figure 1:
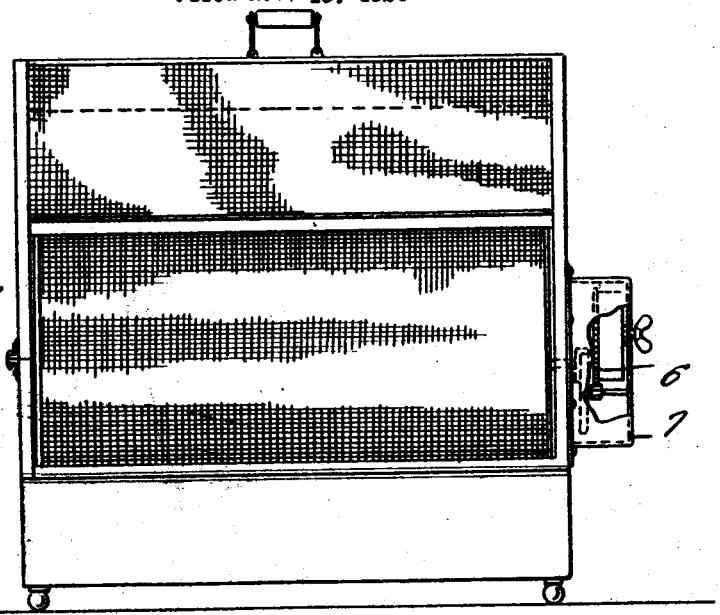
Figure 1 is a side elevational view of the fly catcher with parts broken away, and parts shown in section.
Figure 2:
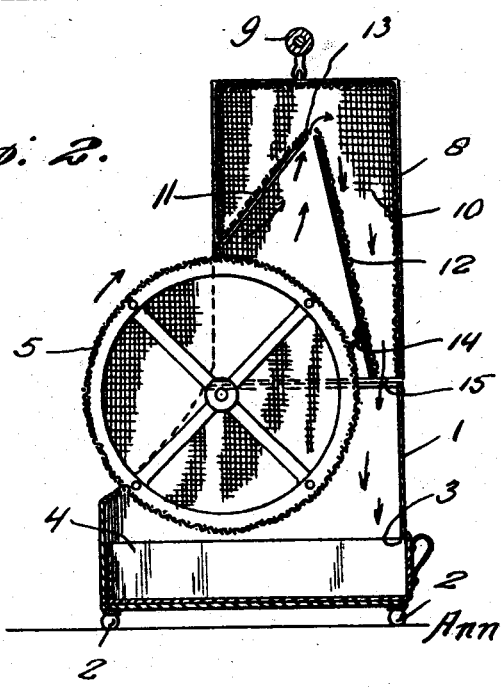
Figure 2 is a transverse sectional view of the fly catcher.

The fly catcher comprises a casing 1 which is mounted upon suitable feet 2. The casing is provided at one side with an opening 3 adapted to receive a pan 4, best shown in Figure 2 of the drawing. A foraminous drum 5 is journaled in the upper portion of the casing 1 and the shaft of the said drum is operatively connected with a spring motor 6 enclosed within a housing 7 mounted at the end of the casing 1. A frame 8 is mounted upon the upper edge of the casing 1 and is provided at its upper side with a handle 9. Screen sections 10 form the side and top walls of the fly catcher and are carried by the frame 8. Anti-clined screen sections 11 and 12 are disposed under the frame 8 and within the wall sections 10 and the upper edges of the screen sections 11 and 12 are spaced from each other as at 13. A strip 14 is carried by the screen section 12 and bears at its edge against the periphery of the drum 5 and forms a closure for the space between the periphery of the drum 5 and the screen section 12. The lower edge of the screen section 12 is spaced from the rear screen section 10 of the top portion of the catcher as at 15. The screen section 12 is of greater area than the screen section 11. The screen section 11 is located completely above the top side of the drum 5 while the screen section 12 extends from the line above the top side of the drum 5 to a line approximately horizontal with the axis of the drum.

In operation, the drum 5 is rotated at a slow rate of speed by the spring motor 6. The forward portion of the drum 5 moves in an upward direction as indicated by the arrow in Figure 2 of the drawing. The flies that light upon the upper forward portion of the drum 5 are carried under the lower edge of the screen section 11 and as they approach the screen section 12 they are moving through a comparatively darkened space and consequently they become suspicious and fly in an upward direction toward the light which is coming through the space 13 and in an attempt to make an escape from the trap. The flies pass through the said space and enter the enclosure under the screen section 10. For a period of time, the flies will remain in the upper portion of the top of the catcher but eventually they will descend along the rear screen section 10 and pass out of the top portion of the catcher through the space 15 and descend or fall into the body of the casing 1 and are dropped into the pan 4. When it is desired to kill all of the flies which remain alive and in the upper portion of the trap the whole trap body is placed over a stove or an incinerator and the flies in the upper portion of the trap are suffocated by the heat and fall through the space 15 into the pan 4. At intervals the pan or drawer 4 may be removed from the lower portion of the casing 1 and emptied of its contents, and after being cleaned may be reinserted in the casing. Thus it will be seen that means are provided for concealing the dead or dying flies, as the receiving pan or drawer is enclosed between the solid walls of the casing.

Having thus described the invention, what I claim is:—

A fly catcher comprising a casing, a drum journaled for rotation in the upper portion thereof, a housing of foraminous material mounted upon the casing and receiving the upper portion of the drum, foraminous sections arranged in anti-clined relation, and located under the top of the catcher, the upper edges of the sections being spaced, one of said foraminous sections being located above the drum, and the other foraminous section extending from a line above the drum to a line approximately midway between the upper and lower sides of the drum, the lower edge of the last mentioned foraminous section being spaced from the adjacent side wall of the housing.

In testimony whereof I affix my signature.

Mrs. ANNETT PURVIS.